United States Patent
Teraoka et al.

(10) Patent No.: US 7,183,506 B2
(45) Date of Patent: Feb. 27, 2007

(54) MEASURING AND PRINTING DEVICE

(75) Inventors: Kazuharu Teraoka, Tokyo (JP); Tsutomu Yamada, Kanagawa-ken (JP)

(73) Assignee: Teraoka Seiko Co., Ltd., Tokyo (JP)

( * ) Notice: Subject to any disclaimer, the term of this patent is extended or adjusted under 35 U.S.C. 154(b) by 229 days.

(21) Appl. No.: 10/772,306

(22) Filed: Feb. 6, 2004

(65) Prior Publication Data

US 2004/0168834 A1 Sep. 2, 2004

(30) Foreign Application Priority Data

Feb. 27, 2003 (JP) ............................. 2003-051295

(51) Int. Cl.
G01G 23/38 (2006.01)
G01G 21/28 (2006.01)

(52) U.S. Cl. ..................... 177/2; 177/238; 361/600; 361/728; 346/9

(58) Field of Classification Search ............. 177/2–13, 177/238–244; 346/9–12
See application file for complete search history.

(56) References Cited

U.S. PATENT DOCUMENTS

| | | | | |
|---|---|---|---|---|
| 4,301,878 A | * | 11/1981 | Soe | 177/5 |
| 4,351,403 A | * | 9/1982 | Ferguson | 177/2 |
| 4,598,780 A | * | 7/1986 | Iwasaki et al. | 177/3 |
| 4,630,067 A | * | 12/1986 | Teraoka | 347/180 |
| 4,669,029 A | * | 5/1987 | Svenson et al. | 361/728 |
| 4,693,329 A | * | 9/1987 | Hikita | 177/4 |
| 4,899,182 A | * | 2/1990 | Inoue | 347/138 |
| 6,037,548 A | * | 3/2000 | Baitz et al. | 177/25.13 |
| 6,065,831 A | * | 5/2000 | Kawaura et al. | 347/108 |
| 2005/0108111 A1 | * | 5/2005 | Kranyec | |
| 2005/0156024 A1 | * | 7/2005 | Ichikawa et al. | |
| 2005/0161504 A1 | * | 7/2005 | Ichikawa | |
| 2005/0190533 A1 | * | 9/2005 | Hultzman et al. | |

FOREIGN PATENT DOCUMENTS

JP 2000-247502 9/2000

OTHER PUBLICATIONS

English Language Abstract of 2000-247502.

* cited by examiner

*Primary Examiner*—Randy W. Gibson
(74) *Attorney, Agent, or Firm*—Greenblum & Bernstein, P.L.C.

(57) ABSTRACT

The present invention is to provide to provide a measuring and printing device by which an operation for replacing a label paper can be performed from the front face of the device and a desired size of the operation screen (display operation unit) can be employed independently of a size of a printer. The measuring and printing device comprises a measuring unit in which a measuring tray is disposed over load cells, and a printing unit for printing prescribed particulars such as the value measured by the measuring unit, wherein the printing unit is disposed substantially at the center of the device and a display operation unit is disposed at the front side of the device, and when the display operation unit has opened, the printing unit is exposed such that a paper can be replaced.

7 Claims, 9 Drawing Sheets

MEASURING AND PRINTING DEVICE

BACKGROUND OF THE INVENTION

1. Field of the Invention

The present invention relates to a measuring and printing device installed in a supermarket, store or the like for measuring the weight of an article and printing prescribed particulars, including the measured value, on a label.

2. Description of the Related Art

In over-the-counter selling that measures and sells articles, such as meat, daily dishes, at a supermarket, and the like, a measuring and printing device is used for measuring the weight of an article, printing data such as net weight and price to a label based on the measured value, and then issuing it.

Label paper, on which the prescribed particulars, including the measured value, are printed, is detachably glued on a mount to form a roll shape. It should be appreciated that the label paper needs to be replaced.

A measuring device in which the replacement of label paper can be performed from the front side (the side facing an operator) of the device is already known (for example, refer to Japanese Unexamined Patent Application Publication No. 2000-247502).

However, in the measuring and printing device described in the above publication, the replacement operation of label paper can be performed from the front side of the device, but since the operation surface on which a liquid crystal display containing a numeric keypad and a call key or various action keys are disposed, and a label printer having a label issuing port at the front side thereof, are provided together on the front side of the device, the width of the operation surface is narrowed by the transverse width of the label printer. Namely, the screen width of the liquid crystal display arranged on the operation surface is narrowed. Since the screen width of the liquid crystal display is narrowed, there are problems in that the display content to be displayed on the display may be difficult to see, and items to be displayed on the screen, as well as the number of keys, including a call key, must be limited.

When the screen is made larger in such a device, such that the label issuing port and the screen of the liquid crystal display are provided together, there is a problem in that the size of the entire device must be enlarged.

Furthermore, a conventional label printer has both a printing unit and a measuring unit. A load cell, which is a component of the measuring unit, is disposed at the center of the device, and the printing unit, which is a label printer, is disposed at the side of the device.

In order to ensure that the load imposed on the load cell is uniform, even if members to be provided within the device or the like are omitted, the length from the center of the load cell to the end where the label printer is disposed needs to be secured as a dimension from the center of the load cell to the other end (the end opposite to the side where the label printer is disposed). As a result, the device becomes larger.

SUMMARY OF THE INVENTION

The present invention has been achieved in consideration of the foregoing problems encountered with the related art. It is therefore an object of the present invention to provide a measuring and printing device by which the operation for replacing a label paper can be performed from the front face of the device and the desired size of the operation screen (the display operation unit) can be employed independently of the size of the printer.

It is another object of the present invention to provide a measuring and printing device by which the operation for replacing a label paper can be performed from the front face of the device, which device is small in size.

According to an aspect of the present invention, there is provided a measuring and printing device comprising a measuring unit in which a measuring tray is disposed over the load cells, and a printing unit for printing prescribed particulars, such as the value measured by the measuring unit, wherein the printing unit is disposed substantially at the center of the device and the display operation unit is disposed at the front side of the device, and when the display operation unit has opened, the printing unit is exposed such that the replacement of paper is possible.

In the above, "when the display operation unit has opened" refers to a case in which the display operation unit is moved from the position where it is normally used, for example a case in which a cover of the front side of the device is opened, the display operation unit being fixed to the cover.

With the above constitution, the display operation unit does not depend on the size of the printing unit, and the desired size of the display operation unit can be provided. Furthermore, since the printing unit accommodated and disposed in the device is exposed when the front face (the display operation unit) of the device is opened, label paper mounted in the printing unit can be replaced easily from the front face of the device.

The display operation unit is opened, for example, by turning around the side of the device in a transverse direction as a turning center. In this case, since the side of the display operation unit is pivotally supported to the device side by a hinge structure or the like, it is not necessary to extend cords connected to the display operation unit beyond the required extent, so that even when the display operation unit is turned, excessive external force (tension) is not applied to the cords, and, as such, they are prevented from becoming damaged.

Furthermore, since the display operation unit is turned around the side thereof to cause an opening at the opposite side thereof to appear in accordance with the turning degree, the front space of the device needed for replacing label paper can be small compared with the down drawing type that draws down the device.

Moreover, the display operation unit may be opened integrally with the printing unit. In this case, since the printing unit is exposed to the front side of the device by turning the display operation unit, the replacement of label paper can be performed easily.

A cassette provided with a setting shaft of label paper and a mount take-up shaft may be detachably mounted to the printing unit. With this constitution, the replacement of label paper can be performed easily by attaching/detaching the cassette. For example, by preparing spare label paper filled to a separate cassette, the replacement of label paper can be performed instantaneously with replacement of the cassette.

Furthermore, the load cells maybe disposed at the right side and the left side of the device, respectively, and the printing unit may be disposed between the right and left load cells; when the front part of the device has opened, the printing unit is exposed such that replacement of paper can be possible. In this case, since it is possible to utilize efficiently the space within the device, the device can be made small in size.

The front part of the device may be opened by turning around the side of the device in a transverse direction as a turning center. In this case, the front part is turned around the side thereof as a turning center, so that the opening portion depending on the turning degree appears at the opposite side. Whereby, the front space of the device needed for replacing label paper can be small compared with the down drawing type that draws down the front part of the device.

Further, preferably, a display operation unit is provided in the front part of the device, and when the front part of the device has opened, the display operation unit is opened integrally with the printing unit. In this case, it possible to expose the printing unit to the front side of the device by means of the opening operation of the display operation unit, and it is possible to easily perform the replacement operation of a label paper.

DESCRIPTION OF THE PREFERRED EMBODIMENTS

Preferred embodiments of the present invention will now be described in detail with reference to accompanying drawings.

Figure 1:
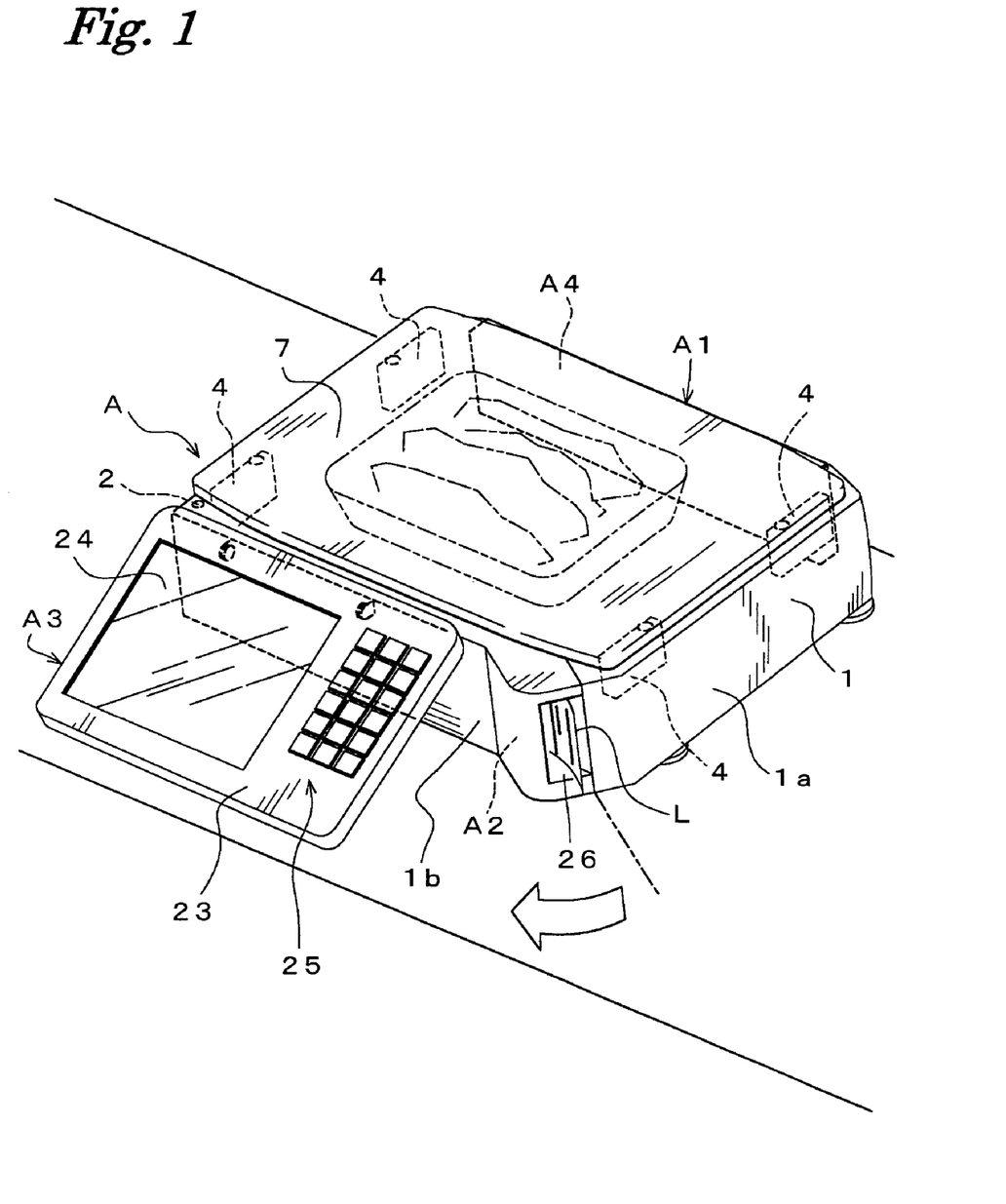
FIG. 1 is a perspective view showing an embodiment of a measuring and printing device according to the present invention.

Referring to FIG. 1, which is an external view showing the whole measuring and printing device A, a measuring unit A1 and a printing unit A2 are contained in a case 1, and a display operation unit A3 is integrally provided at the outside of the front side of the case 1. At the side opposite to the side at which the display operation unit A3 is disposed, a display unit A4 for a customer is disposed for representing the measured contents, the sales price, and the like to a customer.

The case 1 has a substantially rectangular shape in plan view, is made of synthetic resin and metal, and comprises a box-shaped case body 1a of which a peripheral wall of the front side and top surface are opened and a front part 1b which is attached to the opened part of the front side so as to be opened and closed.

Figure 2:
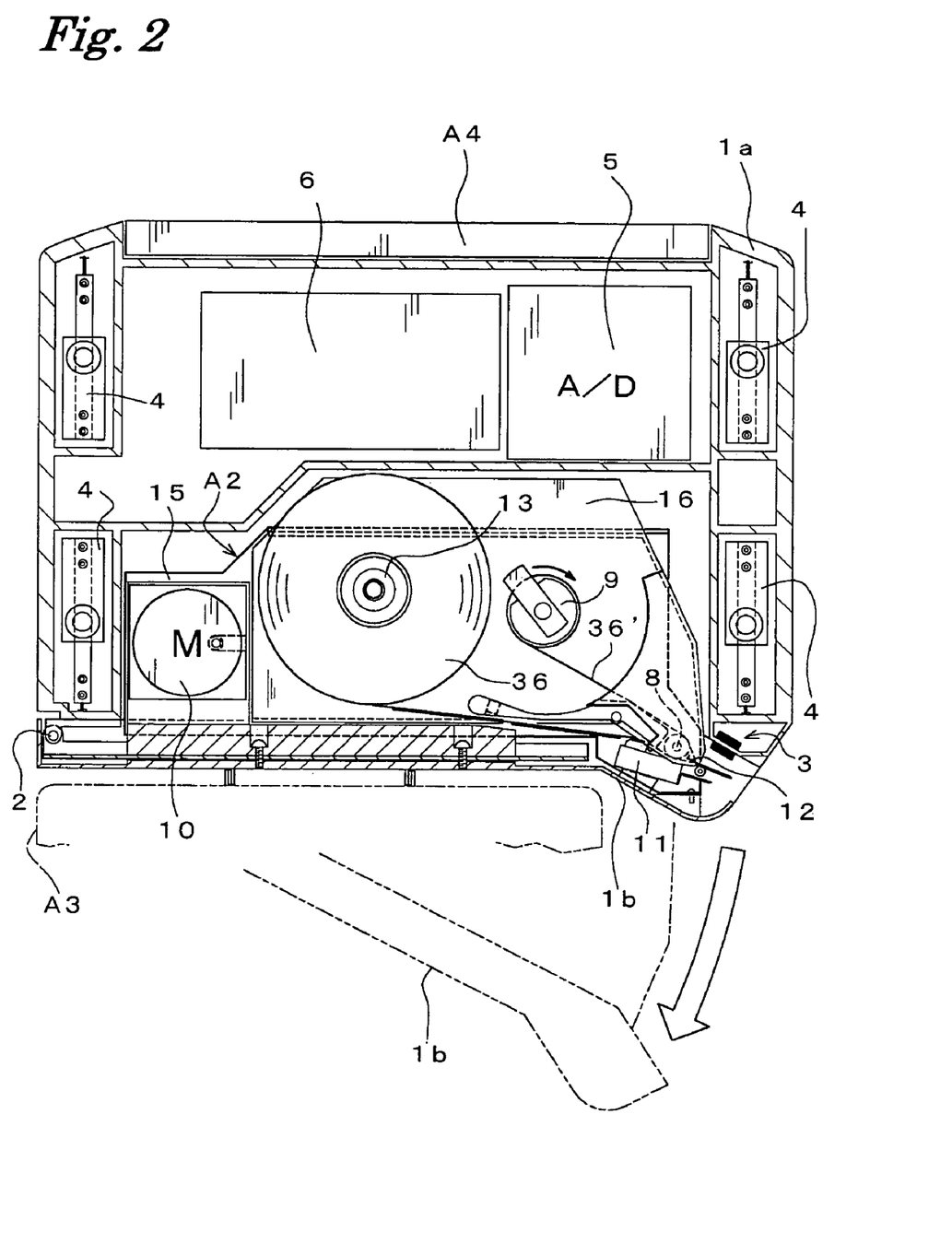
FIG. 2 is a partially cut-away plan view of the device shown in FIG. 1.

The front part 1b is pivotally supported on a pin 2, to be turned with respect to the case body 1a at a side (the left side in figures) in a transverse direction. The other end of the front part is releasably locked to the case body 1a by a magnet 2. The printing unit A2 is attached to the inside of the front part 1b, which is turned so as to be opened and closed, and the display operation unit A2 is integrally attached to the outside of the front part 1b. At the side opposite to the pivotal support consisting of the pin 2 of the front part 1b, an issuing port 26 for issuing a label L which is printed in the built-in printing unit A2 is formed. Furthermore, a locking means for the front part 1b, which is opened and closed, is not limited to an adsorption structure using a magnet 2, and may include other mechanical locking structures.

Inside the case 1 constituted as described above, load cells that constitute the measuring unit A1 are installed at four corners, respectively. In the upper half of the inside of the case defined by four load cells, an A/D converter 5 is accommodated for converting an analog signal which is output from the load cells 4 into a digital signal, and at the side thereof, a power supply 6, a noise filter (not shown), etc., are installed. A measuring tray 7, which has substantially the same size as the planar shape of the case 1, is mounted over four load cells 4. Fulcrum sides of respective load cells are coupled to the main body of the device, and acting sides thereof support the measuring tray 7. Respective components described above are accommodated within a space defined by partition walls formed in the case body 1a.

Furthermore, components of the printing unit A2 are accommodated and arranged within a space formed in the front side lower half in the case 1.

Figure 5:
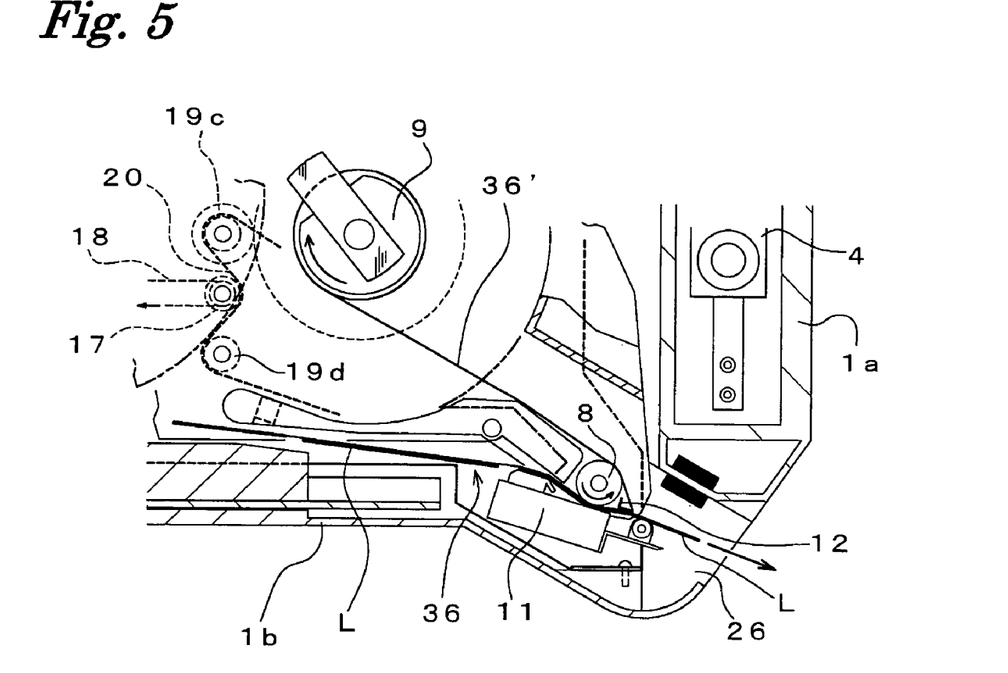
FIG. 5 is a schematic diagram showing the feeding of a label paper in a printing unit.

The printing unit A2 is a known structure comprising a platen roller 8, a mount take-up shaft 9, a stepping motor 10 for driving the platen roller 8 and the mount take-up shaft 9, a thermal head 11, a dispenser 12, a setting shaft 13 for setting roll-shaped label paper 36 and the like. Among them, the stepping motor 10 and a power transmission mechanism 14 for transmitting the rotation of the stepping motor 10 to the platen roller 8 and the mount take-up shaft 9 are installed on the supporting base plate 15 which is inwardly horizontally mounted in the backside lower end of the front part 1b, and the thermal head 11 is attached to the backside of the front part 1b. The platen roller 8, the mount take-up shaft 9, the dispenser 12 and the setting shaft 13 are detachably disposed in the label cassette 16 so as to be slidable with respect to the supporting base plate 15, and the platen roller 8i disposed facing the thermal head 11 positioned at the side of the front part 1b when the label cassette 16 is set. Label paper 36 is peelably glued to a belt-shaped mount 36' having labels L at predetermined intervals and wound in a roll shape.

Figure 3:
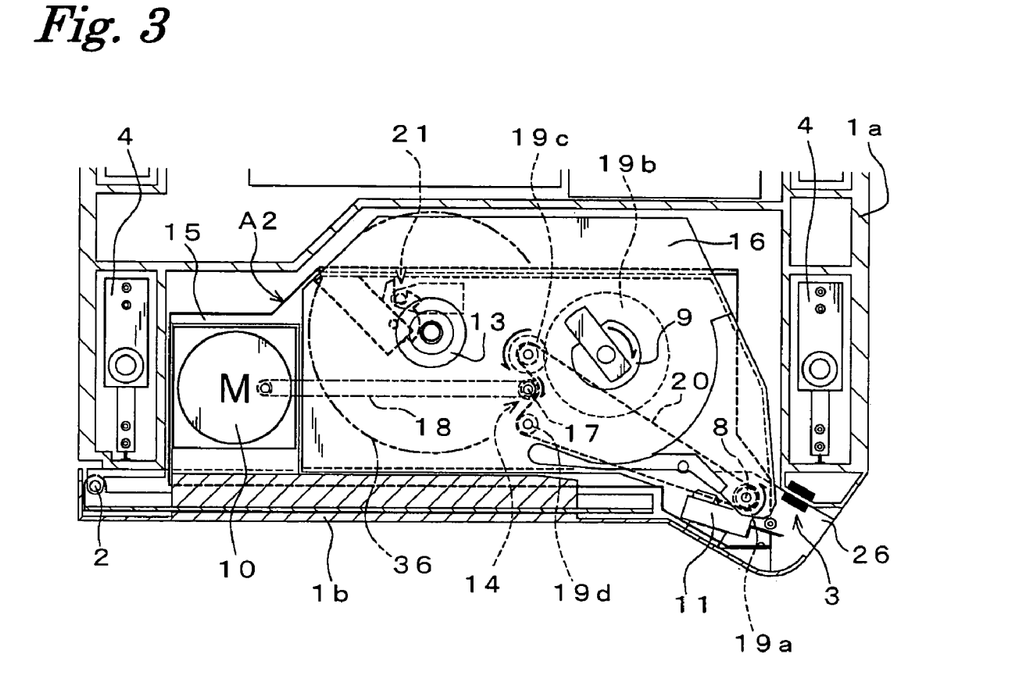
FIG. 3 is a plan view showing a power transmission structure in a printing unit.
Figure 4:
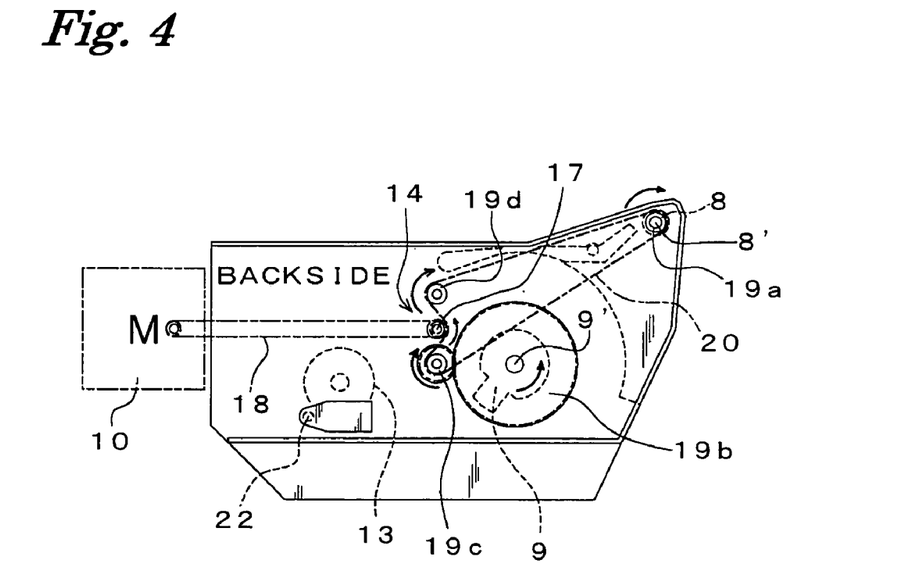
FIG. 4 is a schematic diagram showing a backside of a label cassette.

The power transmission mechanism 14 for transmitting the rotation of the stepping motor 10 to the platen roller 8 and the mount take-up shaft 9 comprises a driving belt 18 wound around the output shaft of the motor, a stepped gear 17 rotatably supported on the supporting base plate 15, and a platen-driving belt 20 toothed at both sides thereof. The platen-driving belt 20 is wound around a gear 19a, a stepped gear 19c and gear 19d by mounting the gear 19a and 19b to a shaft 8' of the platen roller 8 and a support shaft 9' of the mount take-up shaft 9, respectively, at the label cassette 16 side, meshing the stepped gear 19d with the gear 19b fixed to the support shaft 9' of the mount take-up shaft, and then providing the gear 19d at the lower position from the stepped gear 19c at predetermined intervals.

Namely, when the label cassette 16 is slid and set to a predetermined position on the supporting base plate 15, the tip peripheral surface of the stepped gear 17 presses the platen-driving belt 20 between the stepped gear 19c and the gear 19d at the label cassette 16 side to mesh with the platen-driving belt 20, so that the rotating force of the driving belt 18 is transmitted from the stepped gear 17 to the platen-driving belt 20. As a result, the platen roller 8 and the mount take-up shaft 9 can be driven and rotated by means of rotation of the belt 20.

Figure 6:
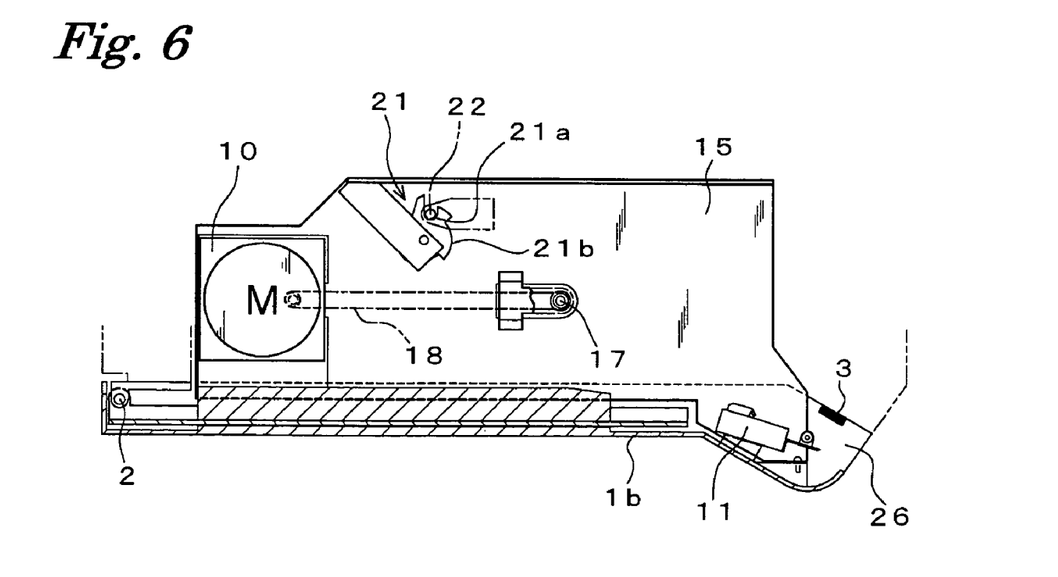
FIG. 6 is a plan view showing an arrangement relationship of a motor and a fixing mechanism on a supporting base plate attached to a front part.

Furthermore, the stepping motor 10 to be provided on the supporting base plate 15 is positioned near the pin 2 which is the turning center of the front part 1b, so that even though the front part 1b is turned, the position of the stepping motor 10 remains substantially the same, and the whole front and rear weight balance is unchanged.

A fixing mechanism 21 for fixing the label cassette 16, which has been slid and set, to a predetermined position is disposed on the supporting base plate 15.

Figure 7A:
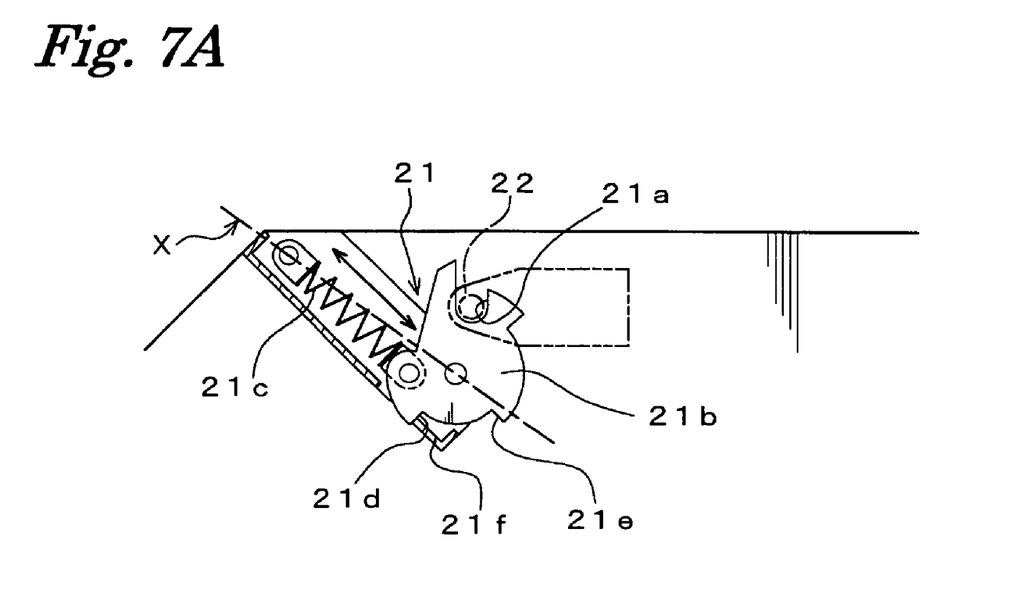
FIG. 7A is an explanatory view illustrating a locked state of a fixing mechanism.
Figure 7B:
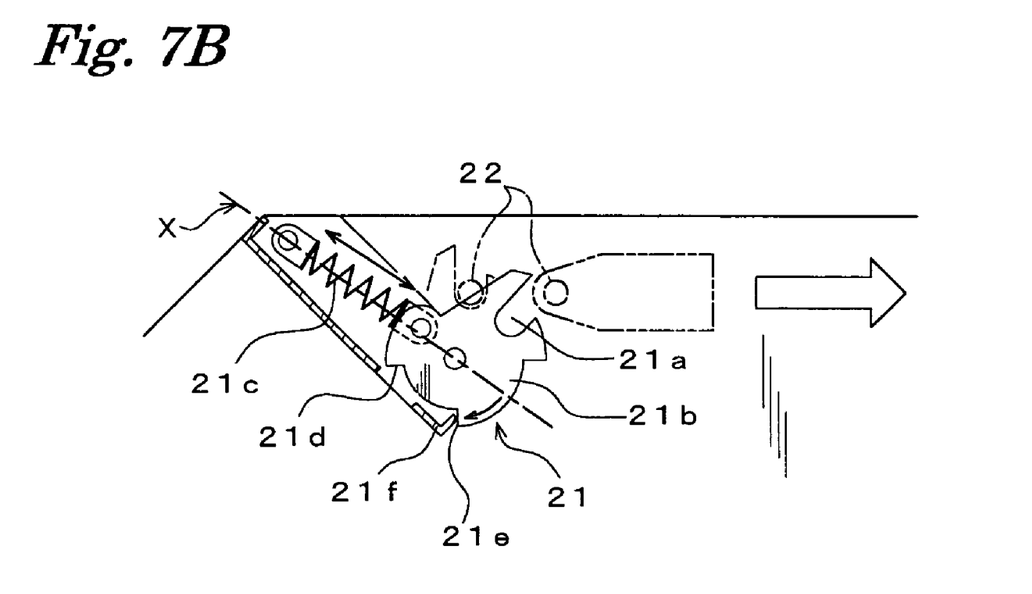
FIG. 7B is an explanatory view illustrating an opened state of a fixing mechanism.

As shown in FIGS. 7A and 7B, the fixing mechanism 21 comprises a rotating plate 21b having formed therein a catching recess 21a into which a catching shaft 22 attached to the backside of the label cassette 16 is fitted, a compression spring 21c for biasing the rotating plate 21b to a locked position, notches 21d, 21a for constraining the turning of the catching recess 21a of the rotating plate 21b between a locked position and an unlocked position by the compression force of the compression spring 21c, and a frame 21f against which the notches 21d, 21e abuts and which support the rotating plate 21b.

Namely, a connecting portion of the compression spring 21c and the rotating plate 21b is positioned inside and outside with respect to the center line X connecting the rotating center of the rotating plate 21b and a fixed end of the compression spring 21c, so that the rotation biasing force is exerted on the rotating plate. As a result, the notch 21d or 21e abuts against the frame 21f to maintain the locked state or opened state. Furthermore, by maintaining the opened state, an opening of the catching recess 21a is positioned on the moving axis of the catching shaft 22 when the removed label cassette 16 is reset.

The display operation unit A3 which is integrally attached to the outside of the front part 1b comprises a flat housing 23a in which a liquid crystal touch panel (a touch key unit) 24 and a numeric keypad (a key input unit) 25 and the like are disposed. An upper side of the display operation unit A3 is pivoted on the external upper portion of the front part 1b in such a manner that the tilting thereof can be controlled.

A user can select a portion displayed on the liquid crystal touch panel (the touch key unit) 24 by touching the screen.

The numeric keypad (the key input unit) 25 comprises a product number key, a digit key, a clear key, a reset key, a paper-feeding key, etc.

Figure 11:
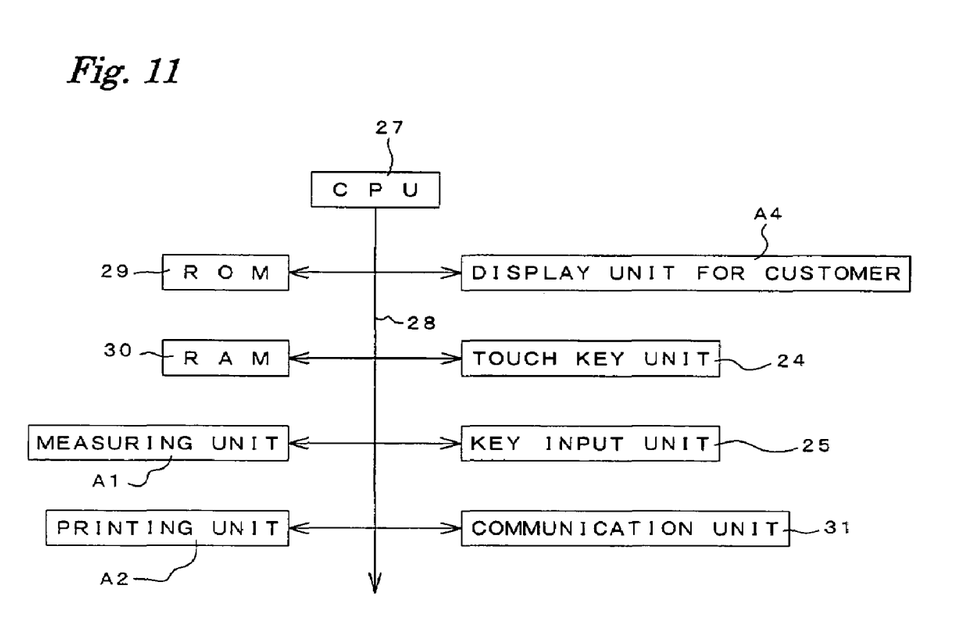
FIG. 11 is an electric block diagram of components of a device.

FIG. 11 is an electric block diagram of the measuring and printing device described above, and has a constitution such that a ROM 29, a RAM 30, the measuring unit A1, the printing unit A2, the display unit A4 for a customer, the liquid crystal touch panel (the touch key unit) 24, the numeric keypad (the key input unit) 25, and a communication unit 31 are connected to a CPU 27 via a bus 28 for controlling each block.

The CPU 27 controls each unit of the device by performing the processing using a work area of the RAM 30 in accordance with a control program of the ROM 29. In the ROM 29, a predetermined control program executed by the CPU 27 is stored.

The RAM 30 has a plurality of memory regions and temporarily stores data read from each file.

The display unit A4 for a customer displays the name or price of the purchased article to the customer, and may scroll a commercial message, such as, for example, "today's recommended article," to appeal to the customer when the measuring unit (scale) is not used, in over-the-counter selling.

The communication unit 31 communicates with another connected scale capable of communicating, or with a managing device (computer) which manages the product file or performance data.

Figure 12A:
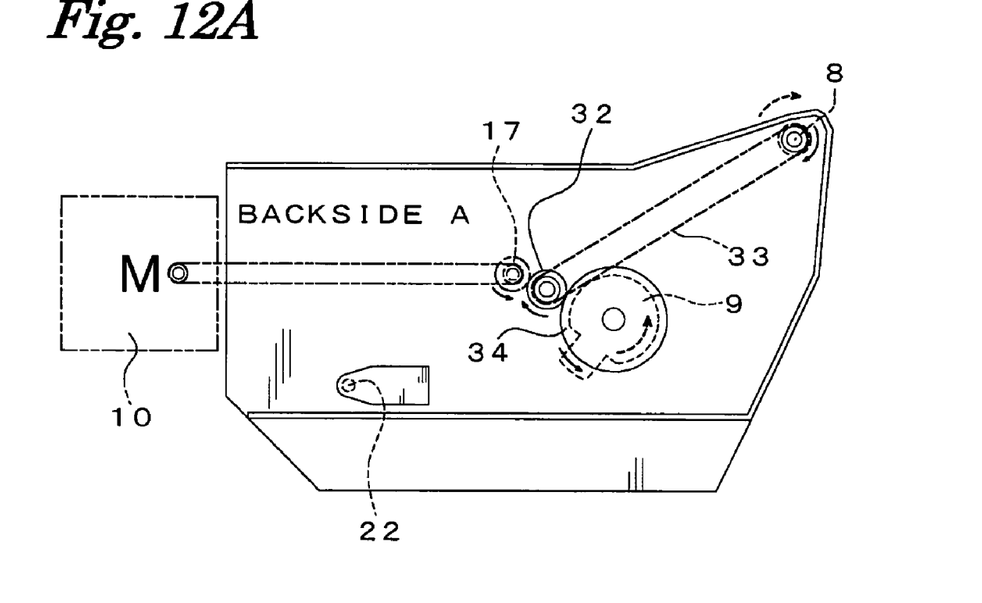
FIGS. 12A and 12B are explanatory views showing the other embodiment of a power transmission mechanism.
Figure 12B:
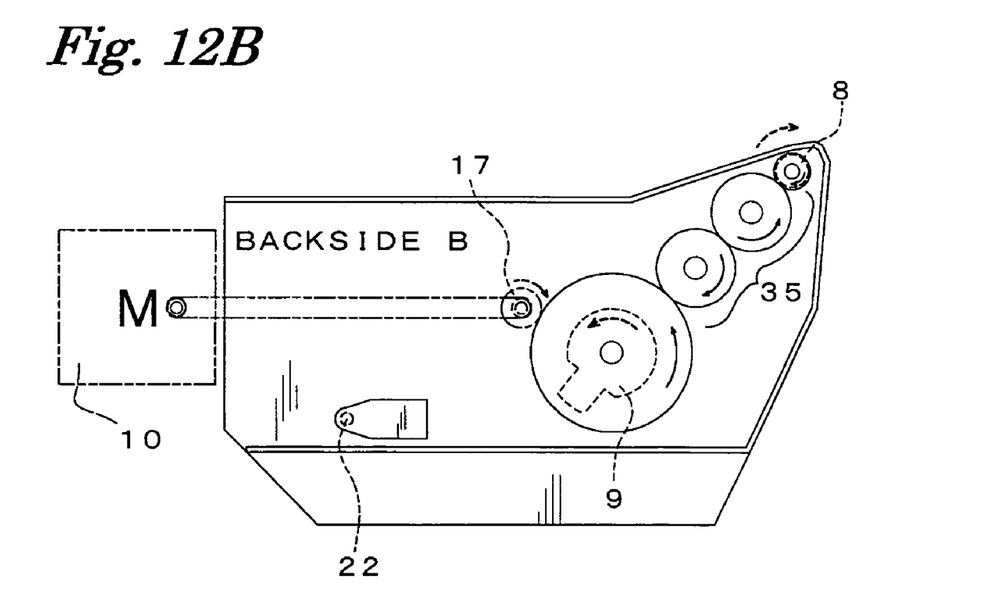

FIGS. 12A and 12B show another embodiment of the power transmission mechanism for transmitting the rotation of the stepping motor 10 to the platen roller 8 and the mount take-up shaft 9. FIG. 12A illustrates a method in which a gear 32 installed at the side of the label cassette 16 meshes with the stepped gear 17 which is rotated by the stepping motor 10, to transmit the rotation of the gear 32 to the platen roller 8 by means of a belt 33 and to the mount take-up shaft 9 by means of a gear 34. FIG. 12b illustrates a method in which the region between the mount take-up shaft 9 and the shaft of the platen roller 8 at the side of the label cassette 16 has a four-gear train 35 which can transmit power, and the end of the gear train 35 meshes with the stepped gear 17 which is rotated by the stepping motor to transmit power.

Figure 8:
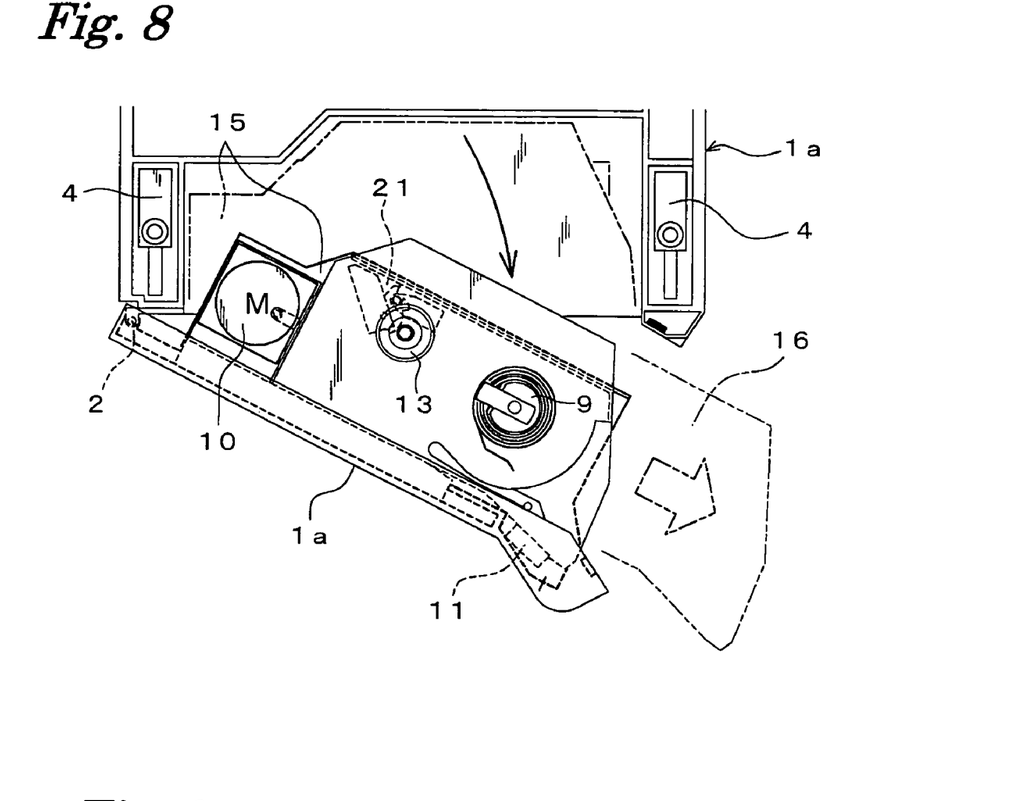
FIG. 8 is a plan view showing a state that a printing unit is unlocked by turning a front part.
Figure 9:
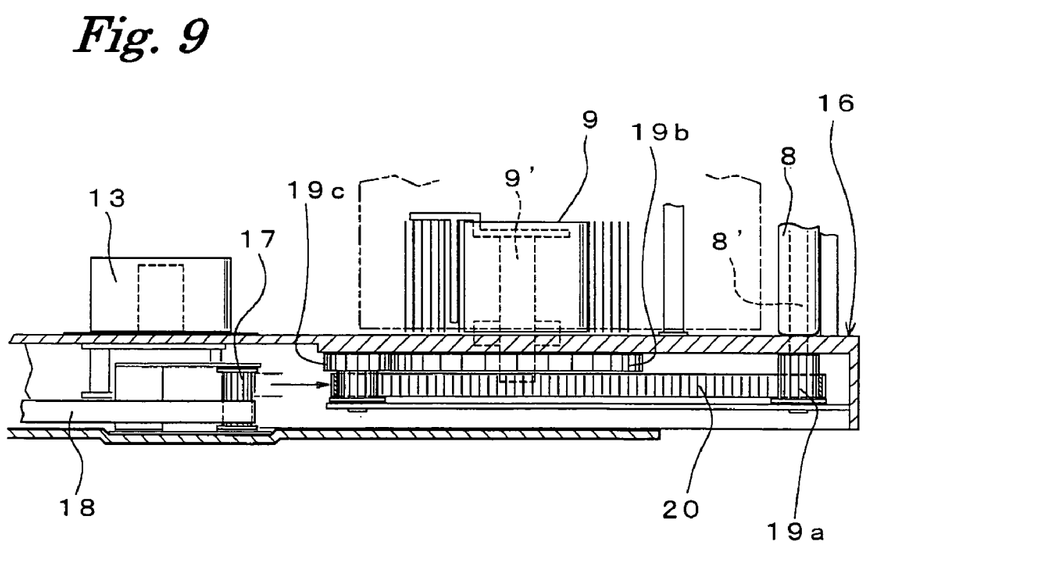
FIG. 9 is an explanatory view illustrating a relative relationship of a power transmission structure when a label cassette is removed from a supporting base plate.
Figure 10:
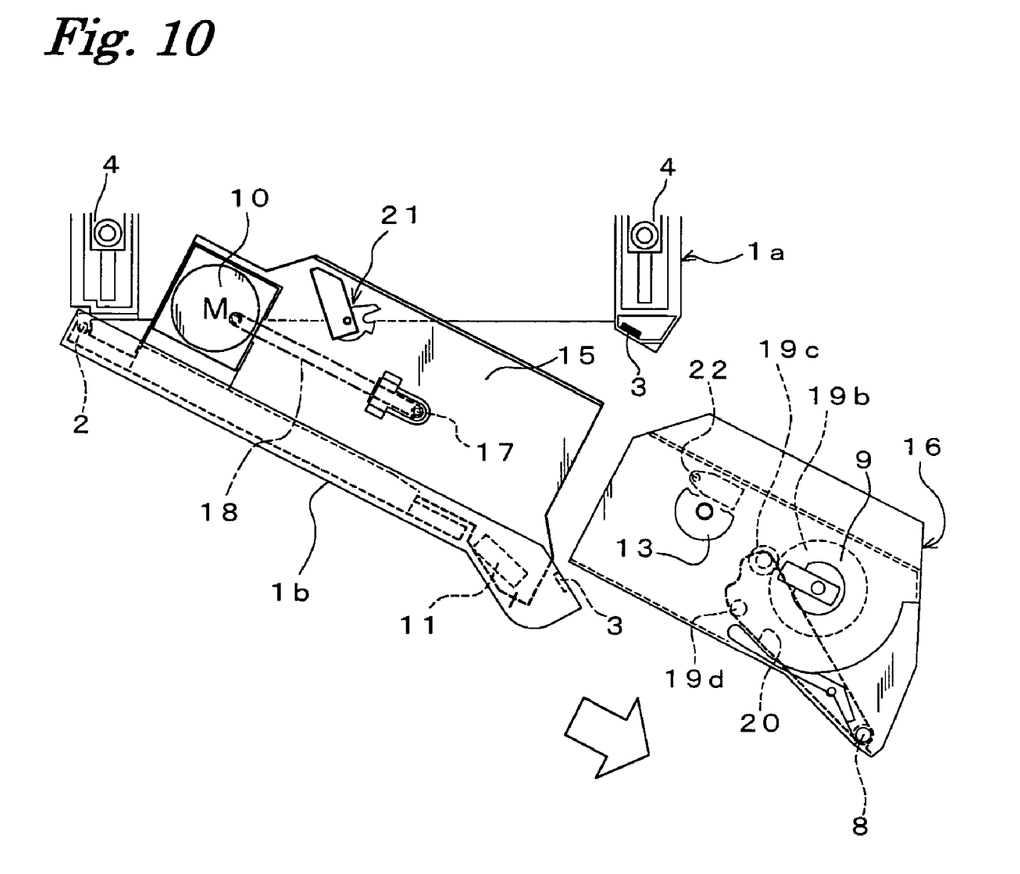
FIG. 10 is a plan view showing a state when a label cassette is removed from a supporting base plate.

The measuring and printing device A, as described above, measures the weight of an article by loading the article on the measuring tray 7, and, in over-the-counter selling, articles are loaded until the purchasing weight to be desired by the customer is achieved and the measured value of the loaded article and the called data are displayed on the display unit A4 for a customer. When the weight reaches the weight desired by the customer, a label function key of the display operation unit A3 is manipulated. Then, the printing unit A2 is operated to print data such as the product unit price, the net weight, the selling price, etc., to the label L, and to issue a label from the issuing port. When the label paper 36 set in the print is discarded and new label paper replaces it, as shown with a phantom line in FIG. 2, the front part 1a is turned around the pin 2, and then the front part of the case 1 is opened substantially in a fan-like form in plan view. Subsequently, the label cassette 16 slidably mounted in the printing unit A2 is linearly pulled out of the opening, as shown with a phantom line in FIG. 8, the locked state of the fixing mechanism 21 is released (refer to FIGS. 7A and 7B), and the label cassette 16 is removed from the supporting base plate 15 through the opening, whereby it is possible to draw out the label cassette 16 (refer to FIG. 10).

When the label cassette in which new label paper is set is set into the printing unit A2, the reverse operation to the above-described operation is performed. Namely, the label cassette 16 slides linearly along the supporting base plate, and then the power transmission mechanism 14 is united and, simultaneously, the catching shaft 22 at the side of the label cassette 16 is fitted into the fixing mechanism 21 disposed on the supporting base plate 15 to thereby establish the setting of cassette.

The present invention is not limited to the embodiments described above, and may be changed within a range not departing the feature of the invention.

(1) In the illustrated embodiment, the front part 1b is supported on the left side, and is opened and closed at the right side, but the inverse opening/closing form may be possible.

(2) The opening/closing of the front part 1b has a turning center at a side of the device in a transverse direction, but the side of the device in a longitudinal direction (the upper side edge or lower side edge) may be a turning center.

(3) The number of load cells which are accommodated and disposed in the case is not limited to four disposed at four corners, as shown in the figures, but may be two each at the left side and the right side.

(4) The printing unit may not be disposed at the opening/closing portion (cover), but may be disposed at the main body side of the device. Furthermore, the main body of the printing unit may be disposed at the main body side of the device, and the cassette may be disposed at the cover side.

(5) The opening/closing of the front part 1b is not limited to the turning type, but it may be a down drawing type.

(6) The label may be set directly on the exposed printing unit by opening the front part 1b, without employing the cassette.

(7) The load cells may not be disposed at four corners of the device, but one load cell may be disposed near the center of the device, and the printing unit may be provided in the space between approximately the center of the device and the front thereof.

With the measuring and printing device according to the first aspect of the present invention, the display operation unit does not depend on the size of the printing unit, and the desired size of the display operation unit can be provided. Furthermore, since the printing unit is exposed by opening the front part of the device, label paper set in the printing unit can be replaced easily from the front side of the device.

With the second aspect of the invention, in addition to the above-described effect, it is not necessary to extend a cable or cord connected to the display operation unit beyond the required extent, so that excessive tension is not applied to the cable or cord, thus preventing them from becoming damaged. Furthermore, since the printing unit is exposed by means of turning, the front space of the device needed for replacing label paper can be small compared with the down drawing type that draws down the device.

With the third aspect of the invention, in addition to the above-described effects, since the display operation unit and the printing unit are integrally opened by the opening of the front part, the replacement of label paper can be performed more easily.

With the fourth aspect of the invention, in addition to the above-described first effect, the setting of label paper can be performed easily. Namely, by preparing spare label paper in a separate cassette, the replacement of label paper can be performed instantaneously with replacement of the cassette.

With the fifth aspect of the invention, since it is possible to efficiently utilize the space within the device, the device can be made small in size.

With the sixth aspect of the invention, the front part is turned around the side thereof as a turning center, so that an opening depending on the turning degree appears at the opposite side. Therefore, the front space of the device needed for replacing label paper can be small compared with the down drawing type that draws down the device.

With the seventh aspect of the invention, it possible to expose the printing unit to the front side of the device by means of the opening operation of the display operation unit, and the replacement operation of the label paper can be performed easily.

Having described specific preferred embodiments of the invention with reference to the accompanying drawings, it will be appreciated that the present invention is not limited to those precise embodiments, and that various changes and modifications can be effected therein by one of ordinary skill in the art, without departing from the scope of the invention, as defined by the appended claims.

What is claimed is:

1. A measuring and printing device comprising a measuring unit in which a measuring tray is disposed over load cells, and a printing unit for printing prescribed particulars such as the value measured by the measuring unit,
    wherein the printing unit is disposed substantially at the center of the device and a display operation unit is disposed at the front face of the device, and when the display operation unit has opened, the printing unit is exposed such that a label paper can be replaced.

2. The measuring and printing device according to claim 1, wherein the display operation unit is opened by turning around a side of the device in a transverse direction as a turning center.

3. The measuring and printing device according to claim 1, wherein the display operation unit is opened integrally with the printing unit.

4. The measuring and printing device according to claim 1, wherein a cassette provided with a setting shaft of the label paper and a mount take-up shaft is detachably mounted to the printing unit.

5. A measuring and printing device comprising a measuring unit in which a measuring tray is disposed over load cells, and a printing unit for printing prescribed particulars such as the value measured by the measuring unit, wherein the load cells are disposed at right and left sides of the device, respectively, and the printing unit is disposed between the right and left load cells, and when the front part of the device has opened, the printing unit is exposed such that a paper can be replaced.

6. The measuring and printing device according to claim 5, wherein the front part of the device is opened by turning around a side of the device in a transverse direction as a turning center.

7. The measuring and printing device according to claim 5, wherein a display operation unit is provided in the front part of the device, and when the front part of the device is opened, the display operation unit is opened integrally with the printing unit.

* * * * *